(12) United States Patent
Sedky et al.

(10) Patent No.: US 10,819,747 B1
(45) Date of Patent: Oct. 27, 2020

(54) ENTITLEMENT MAP FOR POLICY SIMULATION

(71) Applicant: Amazon Technologies, Inc., Reno, NV (US)

(72) Inventors: Khaled Salah Sedky, Sammamish, WA (US); Kai Zhao, Seattle, WA (US); Jacob Andreas Kjelstrup, Burien, WA (US); Ajith Harshana Ranabahu, Shoreline, WA (US); Conor Patrick Cahill, Waterford, VA (US)

(73) Assignee: Amazon Technologies, Inc., Seattle, WA (US)

( * ) Notice: Subject to any disclaimer, the term of this patent is extended or adjusted under 35 U.S.C. 154(b) by 635 days.

(21) Appl. No.: 14/498,784

(22) Filed: Sep. 26, 2014

(51) Int. Cl.
  *G06F 21/00* (2013.01)
  *H04L 29/06* (2006.01)
  *G06F 9/48* (2006.01)
  *G06F 9/50* (2006.01)
  *H04W 4/02* (2018.01)

(52) U.S. Cl.
  CPC .......... *H04L 63/20* (2013.01); *H04L 63/104* (2013.01)

(58) Field of Classification Search
  CPC ...................... H04L 63/20; H04L 63/104
  See application file for complete search history.

(56) References Cited

U.S. PATENT DOCUMENTS

| | | | | |
|---|---|---|---|---|
| 8,478,668 B2 * | 7/2013 | Woodward | ............ | G06Q 10/10 |
| | | | | 705/35 |
| 2007/0288890 A1 * | 12/2007 | Wells | ........ | G06F 8/38 |
| | | | | 717/113 |
| 2011/0296523 A1 * | 12/2011 | Schechter | ........... | G06F 21/6218 |
| | | | | 726/21 |
| 2012/0023554 A1 * | 1/2012 | Murgia | .............. | H04L 63/102 |
| | | | | 726/4 |
| 2012/0066670 A1 * | 3/2012 | McCarthy | .............. | G06F 8/61 |
| | | | | 717/169 |
| 2013/0086210 A1 * | 4/2013 | Yiu | ........................ | G06F 21/41 |
| | | | | 709/217 |

FOREIGN PATENT DOCUMENTS

WO  WO-2015105499 A1 *  7/2015 .............. H04W 4/50

OTHER PUBLICATIONS

Fariza Sabrina; "A Novel Entitlement-based Blockchain-enabled Security Architecture for IoT"; 2019 29th International Telecommunication Networks and Applications Conference (ITNAC); Year: Aug. 2019; Conference Paper; Publisher: IEEE; pp. 1-7 (Year: 2019).*

* cited by examiner

*Primary Examiner* — Kendall Dolly
*Assistant Examiner* — Courtney D Fields
(74) *Attorney, Agent, or Firm* — Davis Wright Tremaine LLP

(57) ABSTRACT

A system and method for generating a policy entitlement map usable to provide a visualization of policies based at least in part on a set of resources of a service of a computing resource service provider, a set of actions that can be taken with the set of resources, or one or more identities. The policy entitlement map may be generated to reflect a set of actions performable by identities of the one or more identities, a set of resources accessible by the identities, or a set of actions that may be performed on the resources.

19 Claims, 9 Drawing Sheets

ENTITLEMENT MAP FOR POLICY SIMULATION

BACKGROUND

Resource owners and other administrators of resources often grant users access to resources to support the business needs of the resource owners, administrators and the users themselves. Modern computing systems place a high importance on security of user access to system resources and on maintaining a repository of secure and accurate records of roles, permissions, and/or policies associated with computing system users. In an environment where many users are assigned to roles, permissions and/or policies associated with many different computing system resources, devices, entities, file systems and the like, the repository of user roles, permissions, and/or policies can grow increasingly complex.

In order to manage user privileges, a resource owner may delegate authority to a number of administrators or other owners of the resource such that each of the administrators and owners may define and manage user privileges. Accordingly, the administrators and other owners may need the ability to view the privileges of other users and may need to grant or deny other users access to resources in order to perform actions on behalf of the resource owner while ensuring the security of resources. However, as the size and/or complexity of the system, and/or the number of users in the system increases, there may be a corresponding increase in the difficulty of managing the user roles, permissions, and/or policies.

BRIEF DESCRIPTION OF THE DRAWINGS

Various embodiments in accordance with the present disclosure will be described with reference to the drawings, in which.

DETAILED DESCRIPTION

Figure 1:
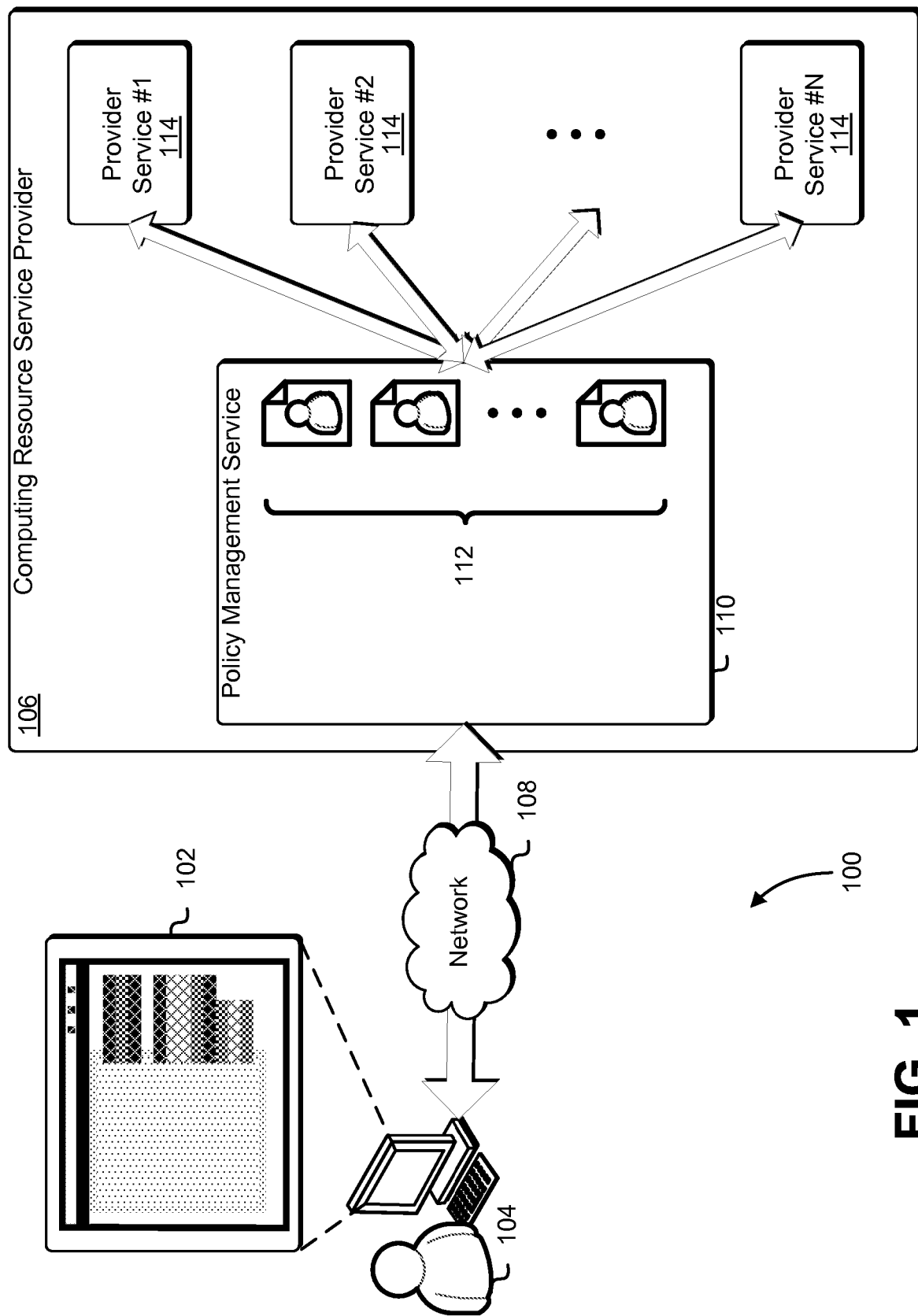
FIG. 1 illustrates an example of a policy simulator in a computing resource service provider environment in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method of generating a visualization of an entitlement map for policy simulation, where an entitlement map may refer to a three-dimensional matrix that defines associations between a set of resources, a set of users, and a set of actions the set of users may or may not perform with the set of resources. The described and suggested techniques improve the field of computing, and specifically the field of access policy management, by providing a new and useful tool for visualizing the interrelationships between computing resources, users, and the actions the users can perform with the computing resources. Additionally, the described and suggested techniques improve the functioning of computer systems, among other ways, by pre-generating certain optimization scripts that may be used by the system to determine user permission levels, which allows the visualization to be generated more quickly. Moreover, the described and suggested techniques offer meaningful advantages over general policy management systems by supporting both dynamic and static visualizations, allowing visualizations to pivot around users, actions, and resources, and providing functionality to change policy data through the visualization interface.

In some embodiments, the visualization of the entitlement map may be a table-based view based around a pivot of one of the dimensions; for example, the table may be comprised of users/identities mapped to actions and based around a resource, users/identities mapped to resources and based around an action, or resources mapped to actions and based around a user/identity. In other embodiments, the visualization of the entitlement map may be a dynamic visualization that allows a user to drill up or down a graph of resources, users, and actions. In some embodiments, a policy simulator may generate a visualization of an entitlement map upon request by an authorized requestor through an interface configured to make application programming interface calls to a service of a computing resource service provider. For example, if the authorized requestor selects a service and a resource of the service from an interface of the computing resource service provider configured to display an entitlement map, the policy simulator may retrieve a list of users of the selected resource, a list of user groups for the selected resource, and applicable policies associated with the lists of users and groups, and generate an entitlement map based on the users, groups, and policies.

In another embodiment, an optimization script for the entitlement map may be pre-generated by the policy simulator. In such embodiments, the policy simulator may, for each service of the computing resource service provider and for each applicable resource of the configured services, retrieve a list of users for the applicable resource, a list of groups for the applicable resource, and applicable policies for the lists of users and groups. Based on the list of users, groups, and applicable policies, one or more executable optimization scripts for determining user permission levels of the entitlement map may be generated and stored until such time that a request to view the entitlement map is received from a user authorized to view it. In some embodiments, a different optimization script is created for each user. Additionally or alternatively, in other embodiments, a different optimization script is created for each resource of the service. Additionally or alternatively, in still other embodiments, a different optimization script is created for each potential action that may be taken with the resources. The executable optimization script therefore may need to be regenerated only in a case where change to an entitlement is detected. In some cases, this pre-generated script may be generated in an executable scripting language, such as Java or JavaScript, which may be downloaded into the authorized user's browser and executed to generate the visualization.

FIG. 1 illustrates an aspect of an environment 100 in which an embodiment may be practiced. As illustrated in FIG. 1, the environment 100 may include a user interface 102 that allows an administrator 104 to generate a visualization of an entitlement map of a policy simulator. The administrator 104 may communicate a request for the entitlement map through a network 108 to a policy management service 110 that manages one or more policies 112 for a computing resource service provider 106 that provides, in addition to the policy management service 110, other provider services 114. In some examples, "administrator" may refer to the user that is actively using the policy simulator to view and/or change policy information, as distinguished from the other "users" being viewed via the policy simulator. Thus, an administrator in this context may not necessarily have a super-user role with the relevant system, service, or computing resource service provider, and, in fact, may include a user utilizing the policy simulator to view his or her own policy information.

The computing resource service provider 106 may provide a variety of services to customers, and the customers may communicate with the computing resource service provider 106 via an interface, which may be a web services interface or any other type of customer interface, to the computing resource service provider. Each service provided by a computing resource service provider may have its own interface, and subsets of the services may have corresponding individual interfaces in addition to, or as an alternative to, a common interface. A customer may communicate with the computing resource service provider 106 through the network 108, whereby the network may be a communication network, such as the Internet, an intranet, an internet service provider (ISP) network, and/or some other such network as described below.

The computing resource service provider 106 may provide aspects of the policy management service 110 and the other provider services 114 to its customers individually, or as a combination of services of a distributed computer system. The other provider services 114 provided by the computing resource service provider may include services such as virtual computer system services, block-level data storage services, cryptography services, on-demand data storage services, notification services, authentication services, and task services. Not all embodiments described include all of the services described and additional services may be provided in addition to, or as an alternative to, services explicitly described.

The network 108 represents the path of communication between the administrator 104 and the computer resource service provider 106. Examples of the network 108 include a Wi-Fi network, a local area network, a wide-area network, a virtual private network, the Internet, an intranet, an extranet, a public switched telephone network, an infrared network, a wireless network, a satellite network, or any combination of such networks. The policy management service 110 may be a computer system configured to manage the policies 112 for users of various services of the computing resource service provider 106. The policy management service 110 may include an interface that enables administrators, such as the administrator 104, to submit requests related to the management of one or more of the policies 112. Such requests may include, for instance, requests to add, delete, change or otherwise modify a policy for a customer or for other administrative actions, such as providing an inventory of existing policies or generating an entitlement map.

In various embodiments, a policy management service permission model may be a role-based access model where the permissions to perform certain operations are assigned to specific roles. In some examples, "permission" refers to the ability of a user to perform certain specified actions with a resource or service in a computing environment. In some examples, a "role" may refer to a set of policies associated with functions that a user may be expected or able to perform. In addition, in some examples, a "policy" may be a set of configuration instructions used to determine aspects of a user's access within a computing environment. In some configurations, the policy may be written in a configurable policy language. In other configurations, an access control list may be used in place of a policy, and in other configurations, a policy as described may be derived from or may co-exist with one or more access control lists.

The policies 112 may be associated with users, groups, roles, and/or resources. A policy associated with a user may indicate that a particular user (e.g., "Bob") may be able to perform a particular action ("create") with a resource. A policy associated with a resource may specify that any user is allowed to read from the particular resource, or only an administrator is allowed to write to this particular resource.

Furthermore, in some examples, a "user" may refer to an individual, a computer system, application identity, or other entity authorized to access to the account; for example, a user in this context may include an application running on a device being operated by an individual. Delegated users may be assigned particular roles, and, through those role assignments, the delegated users may acquire the permissions to perform particular operations and/or actions using particular computing resources. In some cases, delegated users may not be directly assigned permissions, but, rather, delegated users may acquire permission through role assignment. For example, a delegated user may be assigned the role of "authorizer," which may be a role configured to grant permission to the delegated user to approve modifications to the policy.

Moreover, users may be organized into groups. In some examples, a "group" may refer to a set of one or more users associated with a particular category. For example, a group entitled, "Marketing" may include all members of a marketing department of an organization. Or, as another example, users may be grouped according to geographical location. Groups may be used for organizational purposes or may be used to assist in management of large numbers of users; for example, users who are members of internal information technology support services may need different network access permissions than most other users, and may therefore be grouped separately. For this reason, groups may be associated with policies and/or roles and members of the group may inherit the assigned policies and/or roles for as long as they remain members of the group. Thus, users may be associated with one or more roles or policies as an individual, and may be further organized in groups which also may be associated with one or more roles or policies.

Note that a user may belong to multiple groups (e.g., a user may belong to a general "Managers" group as well as an "Engineering Managers" group) or no groups at all. Furthermore, in some cases, groups may be present within groups; e.g., an "Engineering" group may include subgroups of "Engineering Managers" and "Engineers"). Note that the concept of groups and roles may not be present in all embodiments, and, in fact, in some embodiments roles may additionally function as groups, or groups may serve the functions of roles. Moreover, it is noted that the role-based access model described is only one of various access models that may be practiced with the subject matter of the present disclosure.

Figure 2:
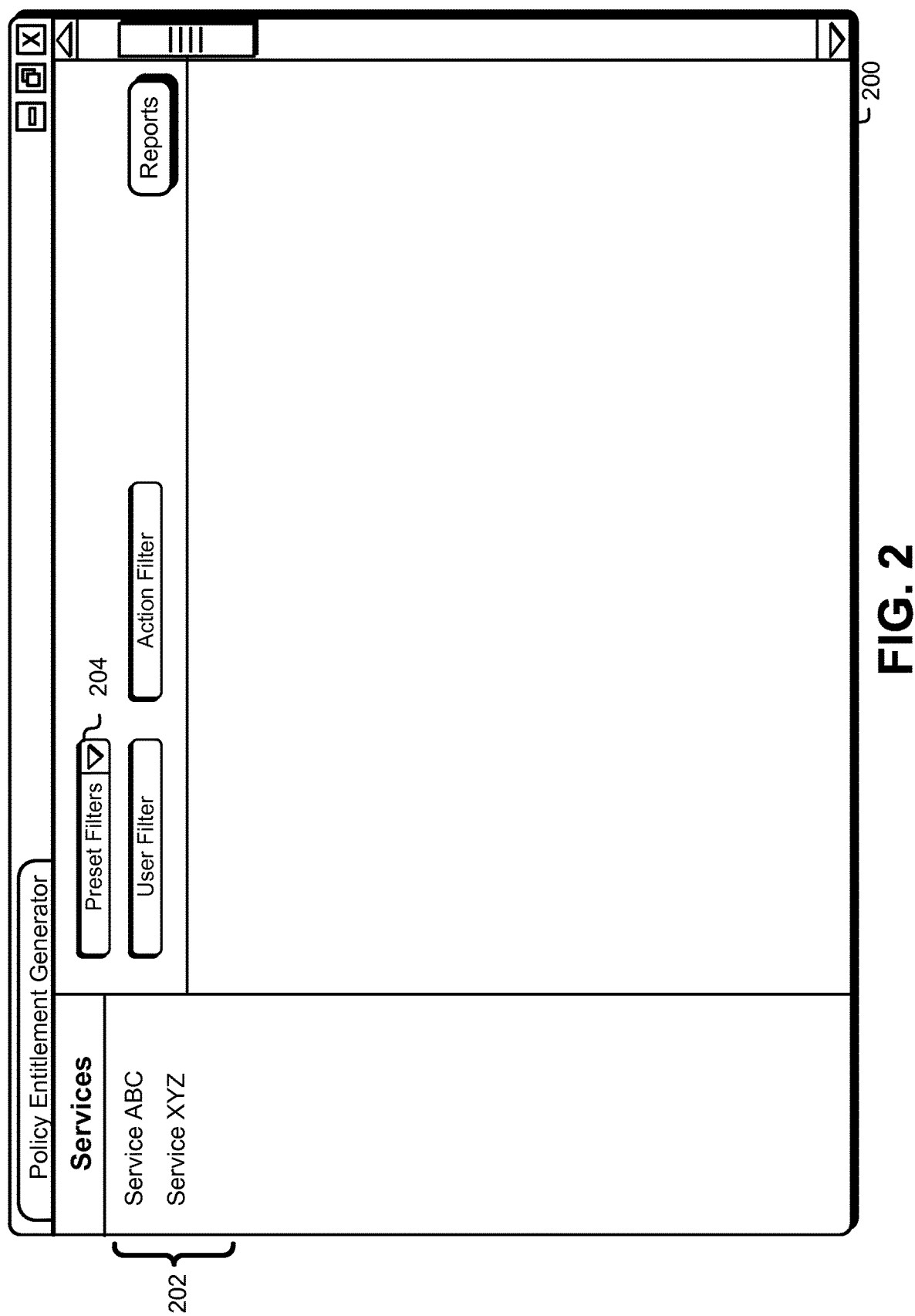
FIG. 2 illustrates an example of user interface for a policy simulator in accordance with an embodiment.

FIG. 2 illustrates an example of a first screen 200 of an interface to a policy simulator for generating a visualization, referred to as an entitlement map. The entitlement map provides visual indicators of what actions a user may perform with resource, application, or service. The first screen 200 represents a menu from which an administrator, such as the administrator 104 of FIG. 1, may select a service from a list of services 202, which may include services such as a data storage service or virtual computer system service, containing a resource for which the administrator wishes to generate an entitlement map.

After the administrator selects a service, the administrator may be presented with a list of resources for the service. For example, if the selected service is a data storage service, the administrator may be presented with a list of database or other data storage resources. Likewise, if the selected service is a virtual computer system service, the administrator may be presented with a list of virtual machine instances. Note that the lists presented to the administrator may be filtered based on the access permissions of the administrator. For example, if the administrator does not have permission to view an entitlement map for certain databases of a data storage service, those databases may not appear in the list of resources. From the list of resources, the administrator may select the resource for which the administrator wishes to view the entitlement map.

Figure 3:
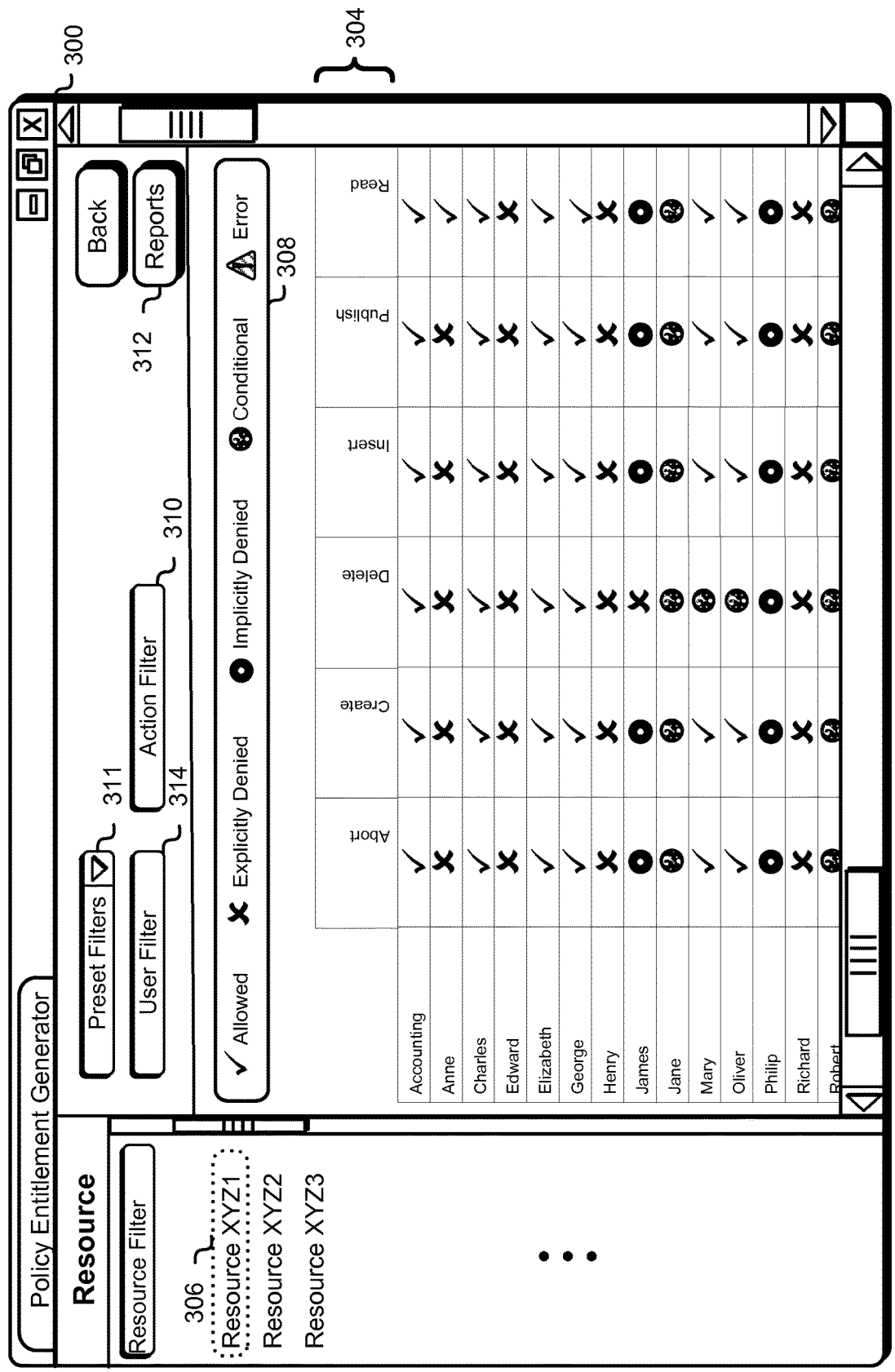
FIG. 3 illustrates an example of an entitlement map in accordance with an embodiment.

In some examples, an "entitlement map" may refer to a three-dimensional matrix that defines associations between a set of resources, a set of users, and a set of actions (or permissions). The interfaces depicted in FIGS. 2 and 3, may allow a viewing user (e.g., an administrator or other authorized entity) to select which dimension to pivot the entitlement map around (such as an interface allowing the selection of a principal for the pivot as either a set of one or more user identities, a set of one or more actions, or a set of one or more resources), as either an intermediate interface or as one or more additional selection controls in either the interface of FIG. 2 or 3. As an example, FIG. 3 illustrates an example of an entitlement map screen 300 in which an embodiment may be practiced where the principal is a resource; e.g., the entitlement map has been pivoted around the dimension of resource. That is, specifically, FIG. 3 depicts the entitlement map screen 300 in the form of a table having a list of user identities 302 mapped to one or more actions of a set of actions 304 associated with one or more resources 306.

However, the entitlement map 300 may alternatively have one or more actions or users as a principal. For example, an entitlement map screen 300 pivoted around the dimension of actions may have the form of a table having a list of user identities 302 mapped to a set of resources associated with one or more selected actions. Likewise, an entitlement map screen 300 pivoted around the dimension of users may take the form of a set of resources mapped to a set of actions 304, showing which actions one or more selected users may or may not perform with the set of resources. Note that in the latter visualization, resources may appear in the visualization of the entitlement map that have no specific association with the one or more selected users; for example, there may be public resources, not associated with any account corresponding to a user, that the viewing user may want have appear in the visualization to see whether the user does or does not have permission to perform certain actions with the public resources.

In the entitlement map screen 300, actions that may be performed with the one or more selected resources 306 may be displayed in cells along a top row. The actions in the list of actions 304 shown may represent different actions that may be taken with the resource, such as create, read, update, delete, and so on.

Note that in some cases the actions and list of actions 304 may be referred to as permissions and a permission list respectively; that is, that the items in the list may represent particular actions that a user may or may not perform with the selected resource. The list of actions 304 in the example of the entitlement map screen 300 are illustrative only, and, depending on the resource, a variety of different actions may be possible. For example, actions associated with a virtual machine instance may include permissions for starting the instance, stopping the instance, terminating the instance, and so on. The information displayed in the entitlement map screen 300 may be generated from policy data associated with the user identities, groups, and roles associated with the one or more selected resources 306. Note that in some embodiments, the policy data may be derived from at least one access control list (ACL) that specifies levels of access to resources of the service. In other embodiments, the policy data may specify levels of access to the resources of the service using a declarative policy language, such as Security Policy Assertion Language (SecPAL), eXtensible Access Control Markup Language (XACML), or other declarative policy language.

The list of user identities 302 may be displayed in cells in a left column. Note that the placement of the list of user identities 302 in a left column and the list of actions 304 in a top row is placement that may be suitable for left-to-right readers, but other placement schemes are contemplated as well, including columns of user identities in a right-most column, rows of actions on a bottom row, user identities in rows and actions in columns, and repeating rows/columns of actions and user identities to aid in tracing user identities and actions when the screen is scrolled. Additionally or alternatively, rows and columns containing headings such as the actions 304 and the list of user identities 302 may be "frozen" such that, as the screen is scrolled, the list of actions 304 and list of user identities 302 are always visible.

Note that the list of user identities 302 column is intended to represent a user identity and, as such, may be labels such as full names, usernames, or other identities, and may include additional metadata, such as an e-mail address, resident address, and/or thumbnail pictures of the user. Note also that the list of user identities 302 may also correspond to identities associated with software applications or other services. For example, an identifier may be associated with an operating system installed in a virtual computer instance, and its appearance in the list of an entitlement map for a data store may represent that the particular operating system of the virtual computer instance has certain permissions to the data store. Likewise, the list of user identities 302 may alternatively or additionally include identities associated with groups. For example, one or more individual user identities may be associated with a group "Accounting," and the Accounting group may appear in the column; in which case, any policies/permissions assigned to the Accounting group may be considered to apply to each user identity that is a member of that group.

Various indicators 308 may be used to depict whether the user identities of the list of user identities 302 do or do not have the particular permission and/or whether any special conditions apply. For example, the entitlement map screen 300 depicts indicators representing statuses of "Allowed," "Explicitly Denied," "Implicitly Denied," "Conditional," and "Error." Allowed may indicate that the user has been specifically granted the particular permission. Explicitly Denied may indicate that an administrator or other authorized entity has indicated that the user may not have the particular permission. Implicitly Denied may reflect that the user has neither been expressly granted nor expressly denied permission to perform the action with the resource, in which case prudence may dictate that the user should not be given access to the resource until expressly allowed. In some cases, if such a permission is assigned to a group of which the user is a member, the user may inherit the permission assigned to the group.

Conditional may reflect that the user has the specified permission, but only under certain conditions, such as, for example, only during a specified time/date range (e.g., read access only on Monday through Friday between 6:00 AM and 3:00 PM) or only when accessing the resource from a local network; thus, without further information the entitlement map may be unable to indicate whether the access is definitely granted or definitely denied. In some embodiments, certain filters may be applied to specify the context of the conditions; for example, if the condition is based on the time of day, specifying a time range in a filter may allow the policy simulator to determine whether access is definitely granted or definitely denied for the user. Error may indicate that the entitlement map was unable to determine a user's permission level; in some cases, Error may indicate that the permission assignments for that user may be corrupt and may need to be repaired by support personnel or a database administrator. Note that additional and alternative types of statuses are possible. Note also that additional and alternative indicators are possible also, such as static or animated icons and other graphical objects, may be text ("Allowed," "Denied," etc.), and form elements (e.g., checkboxes, radio buttons, etc.).

The entitlement map screen 300 may be read by determining where a particular user of the list of user identities 302 and a particular action of the list of actions 304 intersect. For example, the user "Charles," can be seen to at least have "abort," "create," "delete," "insert," and "publish" permissions to the one or more selected resources 306. Conversely, the user "Henry" is seen to have been explicitly denied at least "abort," "create," "delete," "insert," and "publish" permission to the one or more selected resources 306. The users "Mary" and "Oliver" can be seen to have "create" permission with the one or more selected resources 306, but their "delete" permissions for the one or more selected resources 306 is subject to certain conditions. The user "Anne" has "read-only" access to the one or more selected resources 306. While the user "James" has only been implicitly denied abort, create, insert, publish, and read access to the one or more selected resources 306, he has been expressly denied permission to perform "delete" actions to the one or more selected resources 306.

In some embodiments, prohibitions may take priority over allowance. In the entitlement map screen 300, it may be that user "Richard" is a member of the Accounting group. However, even though the Accounting group may have delete access to the "Resource XYZ1" resource, in FIG. 3, Richard has been expressly denied delete access to Resource XYZ1. When such conflicts arise between permissions, in some embodiments an express prohibition (explicit denial) may trump (i.e., have a higher precedence than) the allowance; e.g., Richard may not have delete access to Resource XYZ1 because he has been expressly denied delete access. In other embodiments, permission conflicts may be resolved based on the type of identity the permission is assigned to; for example, permission expressly assigned to individual users may take precedence over permissions assigned a group that the individual users have been assigned to. In still other embodiments, permission conflicts may be resolved based at least in part on group level; for example, permissions assigned to an individual user may take precedence over permissions assigned to a sub-group of which the individual is a member, and, in turn, permissions assigned to the sub-group may take precedence over permissions assigned to a parent group. In some embodiments, a different indicator may be used to indicate where conflicting permissions exist, and alternatively or additionally, hovering over or clicking the indicator may show additional information about the conflict.

In some embodiments, clicking on or hovering over (e.g., with a mouse pointer) an indicator may cause a display of additional information. For example, clicking on the conditional indicator for Mary's "delete" permission may cause a popup window to display that describes the conditions for when Mary is able to perform delete actions and/or when she is unable to perform delete actions. In some embodiments, an administrator or other entity authorized to change or assign user or group permissions, clicking on an indicator may allow the authorized entity an option to change user or group permissions, thereby causing updates to be made to one or more associated policies through the policy management service. For example, and administrator may right-click on the indicator showing that user "Philip" is implicitly denied "create" permission to the selected resource, and small pop-up window may appear and allow the administrator to select to explicitly deny Philip "create" permission; this change may then be persisted to the policy associated with Phillip.

The policy simulator may further support the use of filters with the entitlement map. Filters may be applied to an interface of the entitlement map in various ways, including an administrator typing in a textbox, selecting from a list of filters, or selecting one or more user identities or permissions. The entitlement map screen 300 includes a user filter control 314, a preset filter control 311, and an action filter control 310. The user filter control 314 may be used to search for or filter for particular user identities in the list of user identities 302. For example, typing the letters "Ja" in the user filter control 314 box may cause the entitlement map screen 300 to be generated only with rows of user identities whose names begin with the letters "Ja" which, in the example of FIG. 3 would be "James" and "Jane." Note that, the user filter control 314 form element may be a dropdown control or other type of control that may be used to filter user identities.

Similarly, the action filter control 310 may be used to only display columns of specific types of actions or permissions. For example, an administrator may type "Delete" into the action filter control 310 box to filter out all actions in the view except for delete actions. In some cases, there may be preset filter control 311, whereby an administrator may choose from among one or more preset filters for filtering one of the dimensions of the view. The preset filters may correspond to logical groupings or categories of the dimensions. For example, actions may be categorized by action type; e.g., actions that do not modify data grouped under a category "read only." In such a case, an administrator may select a preset filter, such as "Read Only" from a dropdown list of the preset filter control 311 to display only read only actions in the view (i.e., excluding/filtering-out non-read only actions from being displayed in the visualization). As another example, the preset filter control may allow the user to select from a number of different classifications/categories of actions "destructive actions versus non-destructive actions, or by write actions, read actions, and delete actions. Destructive types of actions may include insert, delete, and update actions and non-destructive actions may include read and list actions. Similarly, user identities may be categorized by different user types, such as "Administrators," etc. Likewise, resources may be categorized for the preset filters to group by different types of resources.

Note that the filter may be any type of control suitable for use as input to specify a filter, including a text box or a multi-select control. Note too that the system may be configured to support the use of wildcard and regular expression filter characters to allow for additional filtering flexibility. Note as well that the filters shown in FIGS. 2 and 3 are for illustrative purposes only; in some implementations there may no filters or there may be more or fewer filters than displayed in FIGS. 2 and 3, and the filters may provide different filtering than described. Furthermore, in some embodiments, some filters may be configured to include or show in the view such items that satisfy the specified filter condition or conditions, and exclude or hide from view items that do not satisfy the specified filter condition or conditions. Additionally or alternatively, in some embodiments, some filters may be configured to include or show in the view such items that do not satisfy the specified filter condition or conditions, and exclude or hide from view items that do satisfy the specified filter condition or conditions.

In some embodiments, as depicted is FIG. 3, the policy simulator may provide a control for generating reports from the entitlement map screen 300 in the interface, such as the reports button 312. For example, clicking on the reports button 312 may cause a comma-separated value file or other suitable report file to be generated and exported to a file location. In some other embodiments, the interface may include a button to generate a printout of the entitlement map screen 300 on a printer.

As noted, policies associated with the viewing user may be taken into consideration when generating an entitlement map. For example, if the viewing user has policy restrictions as to what user identities, groups, services, or resources the viewing user can view, those elements may be hidden or obfuscated from the viewing user. Likewise, in embodiments where the entitlement map allows administrators to change the policies or actions users can perform with a selected resource (e.g., pop-up or mouseover windows with menus to change settings when clicking or hovering on an indicator), if the viewing user does not have authorization to make such changes, indicators may be hidden or greyed out to indicate that the viewing user does not have sufficient privileges to effect such changes.

In these embodiments, the entitlement map may also support confirmation dialogues. For example, if an administrator makes a change, such as removing a user from a group, denying permission to a user or group, or setting conditions on access, a pop-up window may appear and prompt the administrator to confirm the change. Additionally or alternatively, for enabling certain actions, such as destructive actions like "delete," a confirmation dialog may appear to prompt the administrator to confirm that they actually want to give users such permissions. As noted, the policy simulator may provide interfaces to allow user identities to be added or removed to groups, and may allow policies to be assigned or removed from such groups. In some embodiments, there may also be an "everyone" group where default permissions may be assigned to every user of the resource, regardless whether they have permissions expressly set individually or through group membership.

In some embodiments, rather than showing the entire entitlement map screen 300 table or grid at once, the columns may initially be displayed as categories, such as a creation column for creation-type actions, a read column for non-destructive type actions, an update column for update-type actions such as insert and update, and a delete column for deletion-type actions such as delete and drop table. Alternately, actions may be categorized in other ways, such as by importance or most-frequently used. In some of these embodiments, the categories may be expanded to reveal sub-categories (which, in turn, may also be expanded) or actions within the categories by clicking on an icon, heading, or other user control for the column (or row) of the category. In this manner, a viewer may be able to drill down from a default view to a more fine-grained view of the visualization. In some embodiments, the policy simulator may provide a cross-platform interface between various services of different computing resource service providers; for example, a customer may subscribe to a first set of services belonging to a first computing resource service provider and may subscribe to a second set of services belonging to a second computing resource service provider, and the policy simulator may be configured to provide a single interface to view policy information about the resources of both computing resource service providers.

Figure 4:
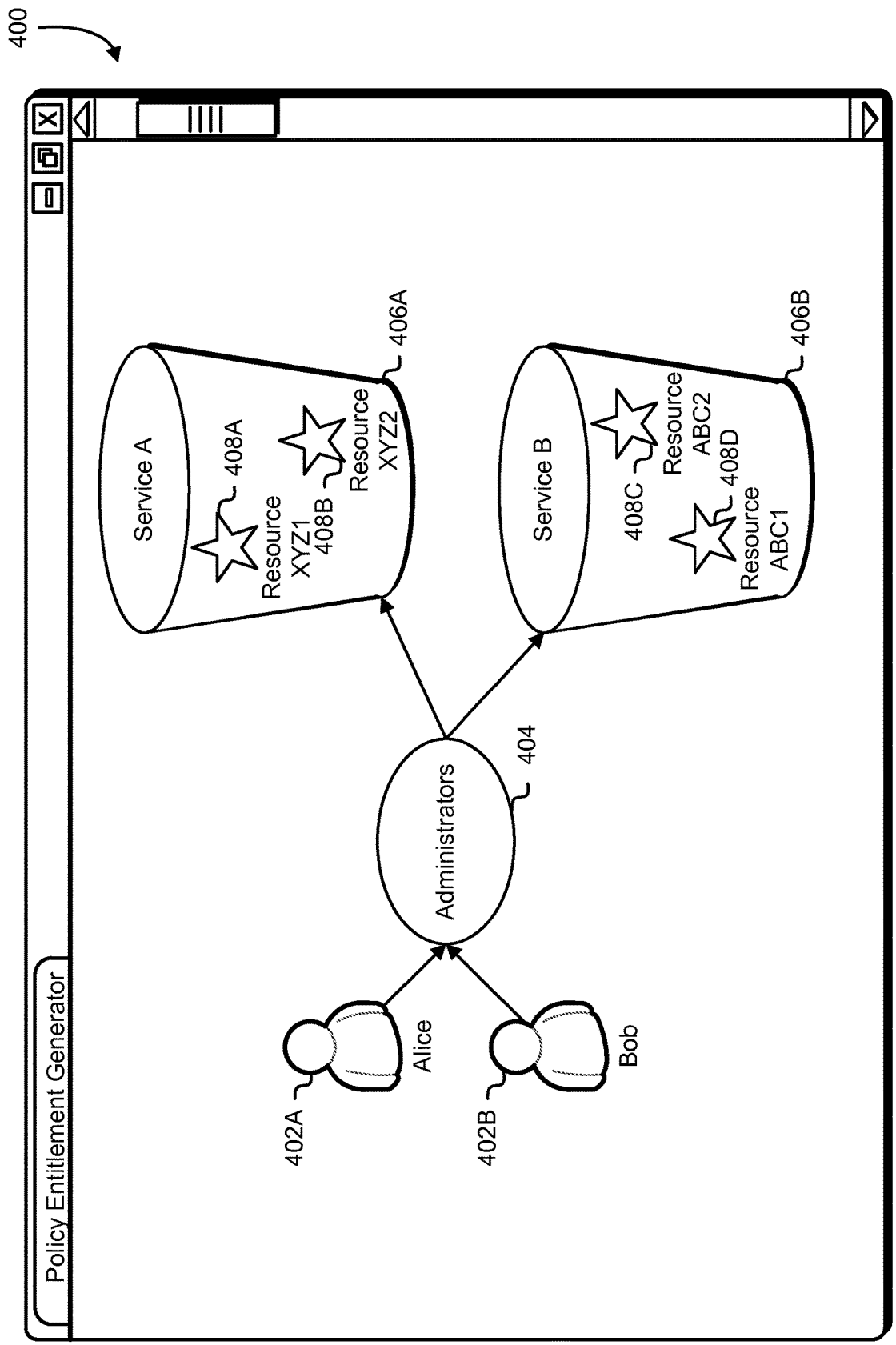
FIG. 4 illustrates an example of another type of entitlement map in accordance with an embodiment.

FIG. 4 illustrates an example of an alternative visualization 400 of an entitlement map in accordance with an embodiment of the present disclosure. Specifically, the alternative visualization 400 of FIG. 4 depicts a graph of one or more user identity nodes 402A-02B, here "Alice" and "Bob" respectively, shown to be members of a group, represented by group node 404, called "Administrators." As shown, the group node 404 Administrators has policies that determine access to one or more service nodes 406A-06B, "Service A" and "Service B" respectively. By virtue of their membership in the group node 404 Administrators, the user identities, represented by the identity nodes 402A-02B, Alice and Bob, may therefore inherit access permissions to the services represented by the service nodes 406A-406B as determined by the group node 404 policies.

The service nodes 406A and 406B are shown to each comprise (i.e., be the parent nodes of) one or more resource nodes 408A-08B. As noted, the type of resources may vary based on the type of service they are provided by. For example, if the service node 406A represents a data storage service, the resource nodes 408A-08B may represent individual data stores. Similarly, if the service node 406B represents a virtual computer system service, the resource nodes 408C-08D may represent individual virtual machine instances.

Note that the shapes depicted in FIG. 4, such as the ellipse for the group node 404, the inverted frustums for the service nodes 406A-06B and the five-pointed star polygons for the resource nodes 408A-08C are for illustrative purposes only, and the shapes may be any shape suitable for visualizing the concept that it represents, and may vary by subtype; for example, if the service node 406B represents a virtual computer system service and the service node 406A represents a different type of service, the resource nodes 408C-08D may represent virtual machine instances and may be represented by squares rather than stars to indicate that the resource nodes 408C-08D are of a different type of resource than the resource nodes 408A-08B.

Figure 5:
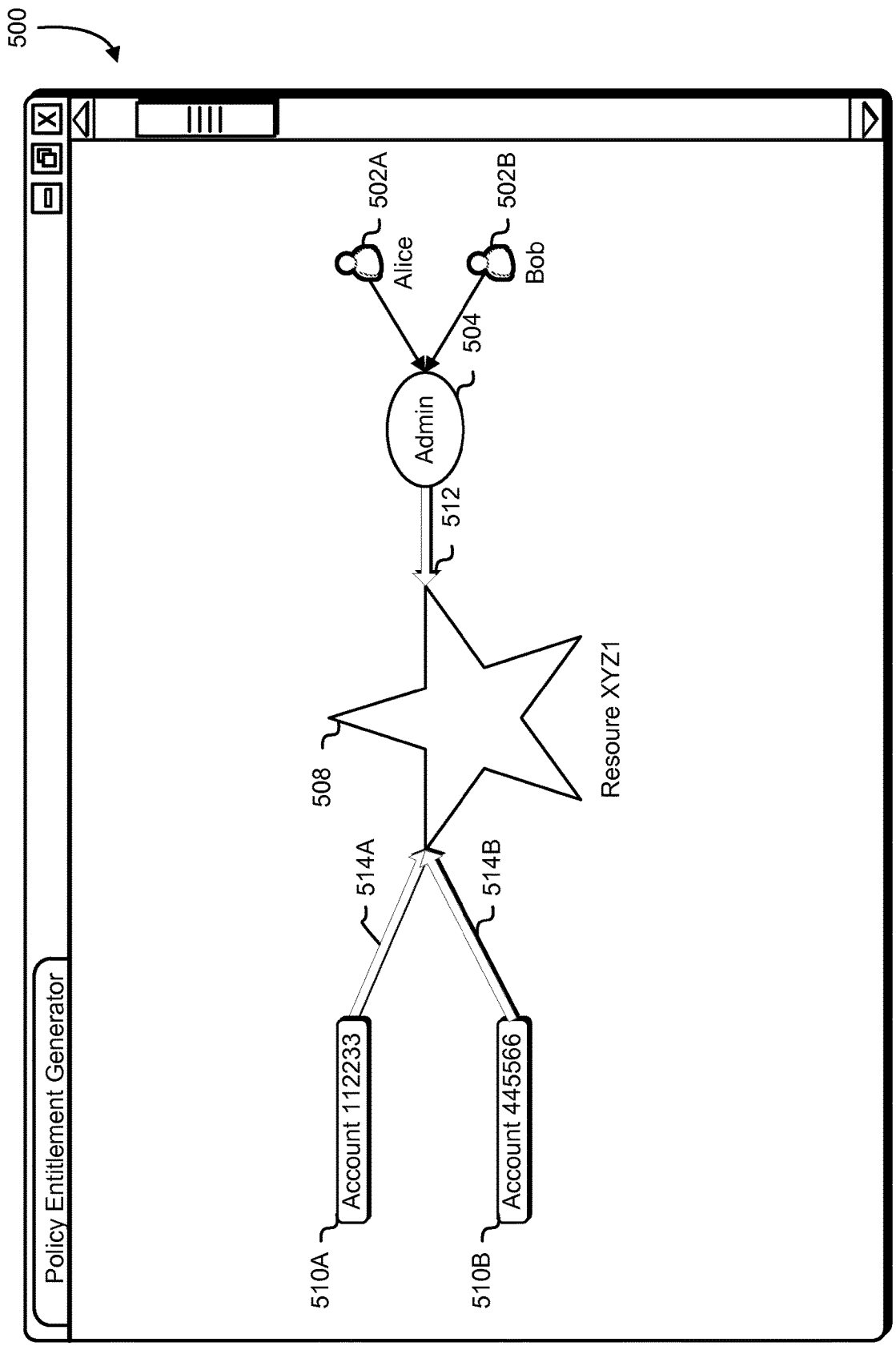
FIG. 5 illustrates an example of drill down functionality of an entitlement map in accordance with an embodiment.

Objects in the alternative visualization 400 may be clickable in order to "zoom" in, out, or to cause the alternative visualization 400 to change in order to "drill in" to provide more or less information about the entitlement map. FIG. 5 provides an illustration of how the alternative visualization 400 of FIG. 4 may transform after the resource node 408A, "Resource XYZ1" is clicked on by a user of the interface. In FIG. 5, a transformed visualization 500 may be produced such that the focus is drawn to the item that was clicked in the previous visualization. For example, the transformed visualization 500 has enlarged resource node 508, which represents the resource node 408A that was clicked in the alternative visualization 400 of FIG. 4. Conversely, the graphic objects representing user identity nodes 502A-02B and group node 504 may be reduced in size as compared to their counterparts, the user identity nodes 402A-02B and the group node 404 of FIG. 4, to reduce their emphasis. Note that, for ease of illustration purposes, the graphic object representing the service node 406A is not displayed, however in some embodiments a representation of the service node 406A may additionally be displayed in the transformed visualization 500.

Note too that the expansion of the resource node 508 has caused additional information to be displayed. For example, in the transformed visualization, it can now be seen that the resource node 508 is also associated with one or more account nodes 510A-10B, "Account 112233" and "Account 445566" respectively. In an embodiment where the services are provided by a computing resource service provider, the account nodes 510A-10B may represent customer accounts with the computing resource service provider. In this manner, the entitlement map screen 300 of FIG. 3 may be expressed in a more dynamic and interactive graphical visualization than a statically-generated report. The arrows 512 and 514A-14B too may be clickable objects. For example, a viewing user may double-click or otherwise select arrow 512, causing it to expand and display the actions that members of the admin group (e.g., Alice and Bob) may perform with Resource XYZ1. In this manner, a viewing user may view the same information as shown in FIG. 3, but in a different visualization. Likewise, a viewing user may expand one of the arrows 514A-14B and view the permissions the corresponding account may have with Resource XYZ1.

Note too that both visualizations of the entitlement map of FIG. 3 and the visualizations of FIGS. 4-5, may be generated by one or more executable scripts or other executable instructions, such as a script comprising one or more of Java, JavaScript, HyperText Markup Language, or Cascading Style Sheets, which may be executed within a browser window. Note too that the information depicted in the alternative visualization 400 and the transformed visualization 500 is for illustration purposes only, and various types of other information may be represented in such visualization, including information about the policies of users, actions that may be taken with particular resources, and whether particular users may be expressly denied, implicitly denied, or allowed to take those actions with the particular resources and/or whether such permissions may be subject to one or more conditions.

Figure 6:
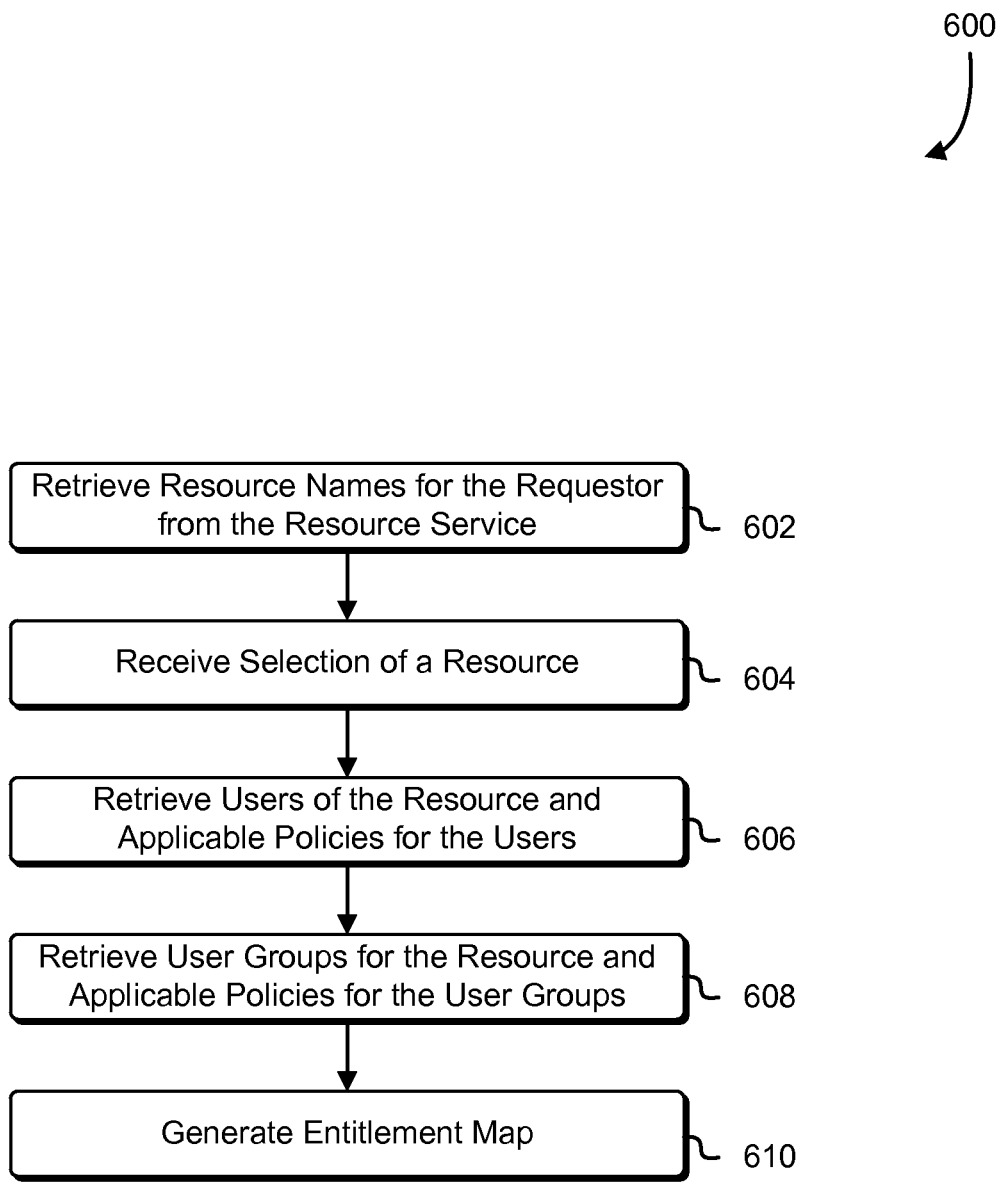
FIG. 6 is a block diagram that illustrates generating an entitlement map for a resource in accordance with an embodiment.

FIG. 6 is illustrating an example of a process 600 for generation of an entitlement map in accordance with various embodiments. The process 600 may be performed by any suitable system such as a server in a data center, multiple computing devices in a distributed system of a computing resource service provider, or any electronic client device such as the electronic client device 902 described in conjunction with FIG. 9. The process 600 includes a series of operations wherein services and resources are selected, user identities and policies are retrieved, and an entitlement map is generated.

In 602, a requestor submits a request, such as through an application programming interface, that causes the system performing the process 600 to retrieve names of resources for a particular service. The request may have been a selection of the particular service through a web page, standalone interface, or other application. In some cases, such as where the system only supports the particular service or where the requestor only has access to resources with the particular service, the particular service may be presumed from this context. For example, the system performing the process 600 may initially request the identity and credentials of the requestor and, with reference to a user profile associated with the requestor, may determine a set of services associated with the requestor. If only one service is in the set, that service may be presumed. If multiple services are in the set, the requestor may be presented with an interface allowing the requestor to select a service containing resources the requestor wishes to view.

In 604, once the system performing the process 600 has identified the service, a set of resources to which the requestor has authority to access may be retrieved and displayed to the requestor for selection. The resources of the set may be referenced by their corresponding unique identifiers, such as by resource names. For example, if the selected service was a data storage service of a computing resource service provider, the set of resource names may correspond to data store resources. Similarly, if the selected service was a virtual computer system service of a computing resource service provider, the set of resource names may correspond to virtual machine instances.

In 606, once the system performing the process 600 receives a resource selection from the requestor, the system may retrieve a set of user identities for the resource. Then, for each user identity of the set of user identities, the system may retrieve the applicable policies associated with the user. In 608, groups associated with the resource may also be retrieved. Depending on the access policy model of the particular embodiment, in some cases, this may be performed by retrieving groups associated with the resource, while in other cases this may be performed by retrieving groups associated with the user identities of the resource. Determining the policies applicable to a user may comprise determining which policies are attached to the user, and then determining which policies are attached to user groups of which the user is a member. In some cases, retrieving the groups and/or retrieving the policies associated with the user identities and groups may be performed using one or more application programming interface calls (e.g., "retrievePolicies(userList)").

Figure 8:
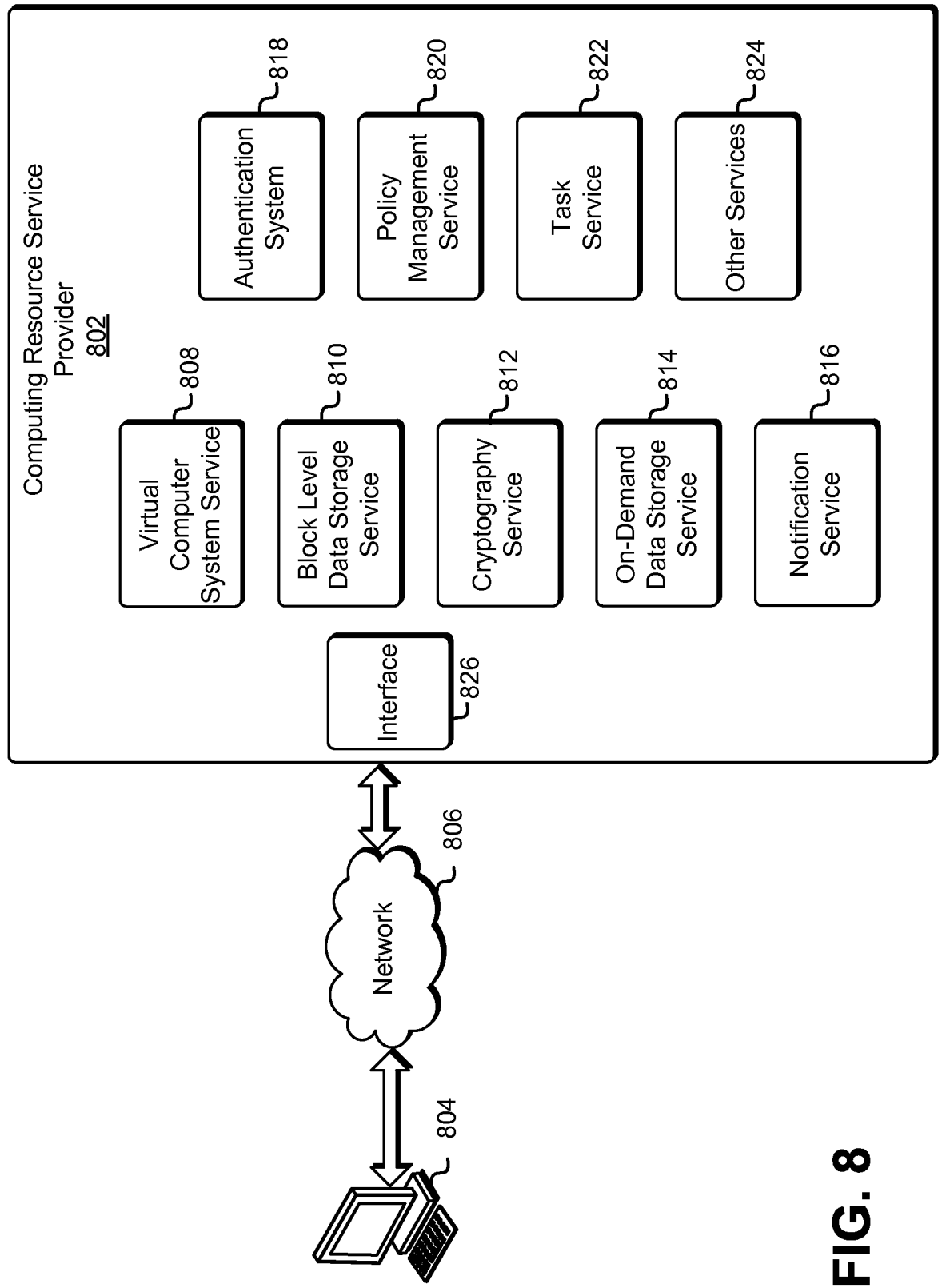
FIG. 8 illustrates an example of a customer connected to a computing resource service provider.

Note that in some cases, the policies may be received through a policy management service, such as the policy management service 110 described in conjunction with FIG. 1 or the policy management service 820 described in conjunction with FIG. 8; however, in other cases the policy simulator may retrieve policies directly from the service associate with the resource. In some cases, the policy simulator may retrieve policies through the policy management service and only communicate directly with the relevant services to reflect recent changes, such as when a resource has been newly created or instantiated. For example, if a new data store resource has been created under a data storage service, the users and permissions associated with the data store resource may be an initial or default set of users and/or permissions, and such initial or default set of users and/or permissions may not yet have propagated to the policy management service. In such a case, the policy simulator of the present disclosure may communicate directly with the service to determine the current set of resources as well as the current sets of users and permissions for newly-created resources.

Finally, in 610, the entitlement map, such as the entitlement map screen 300 of FIG. 4, displaying the permissions associated with each user identity and/or user group, may be displayed. In some embodiments, the entitlement map may be generated, for each user identity and for each permission, making a function call (e.g., "getPermissionLevel(userID, permissionID)") to a policy simulator, which may return a permission status for each user/permission intersection in the entitlement map. This permission status then may be represented, for example, with certain indicators on, such as the indicators 308 of FIG. 3. Thus, the requestor may then be able to determine at a glance whether a particular user has particular permissions to a selected resource. In some implementations, an optimization script for determining permission levels may be cached as a file on the server or generated as an executable optimization script (such as is described in reference to operations 708 of FIG. 7), and, in such cases may be provided to subsequent requestors without being generated anew unless entitlements have changed. Note that one or more of the operations performed in 602-10 may be performed in various orders and combinations, including in parallel.

Figure 7:
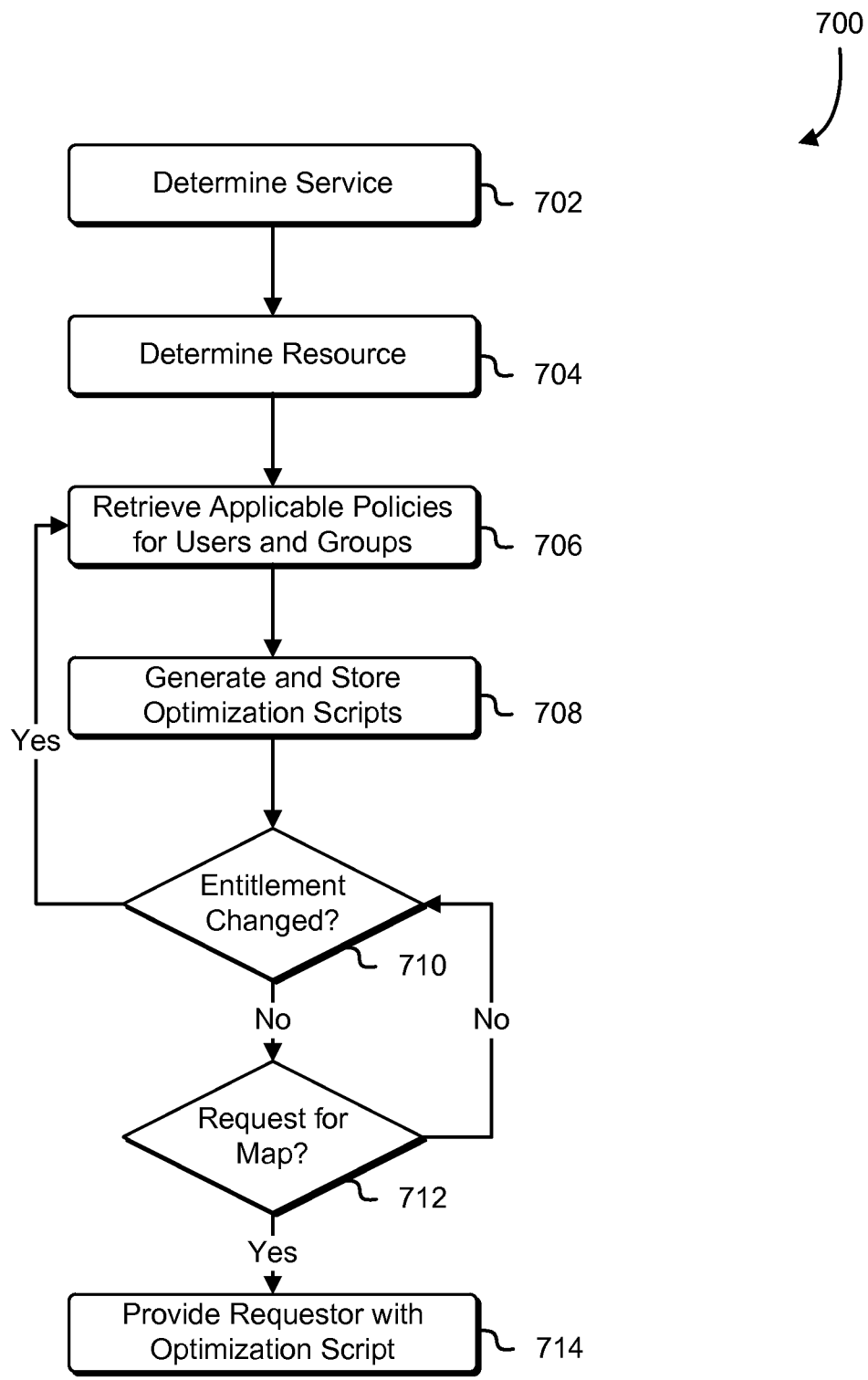
FIG. 7 is a flow chart that illustrates an example of pre-generating an optimization script in accordance with an embodiment.

In complex systems, such as resources with many user identities with many possible permissions, generating the entitlement map in the manner described in reference to FIG. 6 may be time-consuming if generated each time a request is made to generate an entitlement map. Therefore, in some embodiments, pre-processing of entitlement map data may be performed to improve the user experience. FIG. 7 is a flow chart illustrating an example of a process 700 for pre-generating an optimization script in accordance with various embodiments. The process 700 may be performed by any suitable system such as a server in a data center, multiple computing devices in a distributed system of a computing resource service provider, or any electronic client device such as the electronic client device 902 described in conjunction with FIG. 9. The process 700 includes a series of operations wherein for a given resource of a service, an executable optimization script for determining permission levels may be pre-generated and, upon request, provided to the requestor.

In 702, a service having resources for which an entitlement map would be appropriate may be determined. Such a service may be a service of a type as may be provided by a computing resource service provider, such as a virtual computer system service, a block-level data storage service, a cryptography service, an on-demand data storage service, a notification service, an authentication service, a policy management service, a task service, or an archival data storage service. Note that operations in 704-08 may be repeated for each service of a set of available services.

In 704, a resource for the determined service may be determined. For example, a resource of a data storage service may be a particular data store of the available data stores in the data storage service. Alternatively, for a virtual computer system service, the resource may be a particular virtual machine instance of the available virtual machine instances of the virtual computer system service. Note that operations 706-08 may be repeated for each resource of a set of resources for the determined service.

In 706, the system performing the process 700 may retrieve a set of user identities for the determined resource. Then, for each user identity of the set of user identities, the system may retrieve the applicable policies associated with the user. Next, the groups associated with the user identities and/or the resource may be retrieved, and the policies associated with the groups may also be retrieved. Determining the policies applicable to a user may comprise determining which policies are attached to the user, and then determining which policies are attached to user groups of which the user is a member. In some cases, retrieving the groups and/or retrieving the policies associated with the user identities and groups may be performed using one or more application programming interface calls.

In 708, an optimization script for determining permission levels may be generated by determining a permission status for each user/permission or user/action combination from the user, group, and policy data retrieved in 706. This optimization script may be executable code, such as JavaScript, ActionScript, Dart, VBScript, Typescript, or other executable language code. In some embodiments, the optimization script may be use to quickly evaluate permission levels, such as the permission levels displayed in the entitlement map screen 300 of FIG. 4. As one example, JavaScript may be generated to contain a regular expression (e.g., "if (map.match(/regex/)) {return true};" where "regex" is an appropriate regular expression to find a user and/or action from in the entitlement map data).

Alternatively or additionally, the optimization script may comprise one or more functions which, for an entitlement map pivoted around a principal of one or more resources, may be passed parameters of an identity and an action, and return a value (such as TRUE or FALSE) indicating a whether the identity may perform the action with the resource (or a permission level). Similarly, an optimization script for an entitlement map pivoted around a principal of one or more actions may accept parameters of an identity and a resource and return a value indicating whether the identity may perform the one or more actions with the resource. Likewise, an optimization script for an entitlement map pivoted around a principal of one or more identities may accept parameters of an action and a resource and may return a value indicating whether the one or more identities may perform the action with the resource. Note that in some embodiments, the optimization script may be configured to generate at least a portion of the visualization. In some cases, portions of the entitlement map script may be reduced or optimized, such as in a case where a user has been expressly denied access to a resource; e.g., for that particular user, set of actions, and resource, the script may be simplified to always return false (or "denied").

In some cases, the optimization script may additionally or alternatively be comprised of markup language elements, such as HyperText Markup Language elements or eXtensible Markup Language elements and/or Cascading Style Sheets syntax. Note that such optimization scripts may be suitable to render the entitlement map in a web browser, and optimization script may include one or more other files or scripts, such as scripts in other programming languages, object files, and comma-separated values tables that may be read and rendered to an interface.

From 710-12, the system performing the process 700 may continuously poll or wait for an appropriate trigger. For example in 710, the system determines whether there has been a change to entitlements to the resource. A change to an entitlement may include a change to permissions of a user of the resource, a user of the resource being added or removed, a user being added to or removed from a group associated with the resource, or a policy or role associated with the resource having changed, added, or removed. If one of these events occurs, the system may return to 706 to re-retrieve information for regenerating the optimization script for the affected principal (e.g., resource, action, or identity).

Otherwise, if no entitlements have changed, in 712, the system performing the process 700 may query whether it has received a request to provide an entitlement map to a requestor. If no request has been received, the system may loop back to 710 to check whether the entitlements have changed. However, once a request for the entitlement map has been received and, after confirming that the requestor has sufficient authorization to view the entitlement map, in 714 the system performing the process 700 may provide the optimization script for determining the permission levels to the requestor through the requesting interface, such as a browser. In this manner, the user experience may be enriched by quickly providing entitlement map data using pre-generated policy functions. Note, in some embodiments the system may be configured to push optimization scripts to a client, and in such cases, the optimization scripts may be pushed to the requestor without having explicitly received a request.

Note that in some embodiments, the operations of 710-12 may be swapped. For example, rather than continuously polling whether entitlements have changed, entitlement changes may be checked only after a request is received. Alternatively or additionally, entitlement changes may be checked periodically (e.g., once per hour). Alternatively or additionally, once an optimization script has been provided to a user, the optimization script may be cached on the user's computer and reused if it is determined that the cached optimization script does not need to be updated (e.g., by comparing a checksum or version of the cached optimization script against a checksum or version of the most-recently generated version of the entitlement map on the remote server). Note too, that in some embodiments, the entitlement map may be pushed to the user as needed or periodically; i.e., without receiving a request.

Note too that in some cases, there may be a separate optimization script per user, per resource, and/or per action. In other cases, the optimization script may comprise data for groupings of users, resources, and/or actions of the relevant service. A visualization of an entitlement map for a selected principal may be hastened by passing one or more parameters of an identity, an action, a resource to a function call of the optimization script to yield a permission level or other value for the entitlement map. In this manner, the pre-generated optimization script obviates the need to query or re-parse policy data for each cell of an entitlement map table or other visualization object. In some embodiments, filters may be applied when generating the visualization of the entitlement map. For example, by executing a function call within the optimization script, passing parameters of resource name and an action, action category (e.g., destructive actions vs. non-destructive actions), username or other user identifier, or a search string, the function call may return a value that excludes data that does not satisfy conditions specified by the parameters. Note also that one or more of the operations performed in 702-16 may be performed in various orders and combinations, including in parallel.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

FIG. 8 shows an example of a customer connected to a computing resource service provider in accordance with at least one embodiment. The computing resource service provider 802 may provide a variety of services to the customer 804 and the customer 804 may communicate with the computing resource service provider 802 via an interface 826, which may be a web services interface or any other type of customer interface. While FIG. 8 shows one interface 826 for the services of the computing resource service provider 802, each service may have its own interface and, generally, subsets of the services may have corresponding interfaces in addition to or as an alternative to the interface 826. The customer 804 may be an organization that may utilize one or more of the services provided by the computing resource service provider 802 to maintain and deliver information to its employees, which may be located in various geographical locations. Additionally, the customer 804 may be an individual that utilizes the services of the computing resource service provider 802 to deliver content to a working group located remotely. As shown in FIG. 8, the customer 804 may communicate with the computing resource service provider 802 through a network 806, whereby the network 806 may be a communication network, such as the Internet, an intranet or an Internet service provider (ISP) network. Some communications from the customer 804 to the computing resource service provider 802 may cause the computing resource service provider 802 to operate in accordance with one or more embodiments described or a variation thereof.

The computing resource service provider 802 may provide various computing resource services to its customers. The services provided by the computing resource service provider 802, in this example, include a virtual computer system service 808, a block-level data storage service 810, a cryptography service 812, an on-demand data storage service 814, a notification service 816, an authentication system 818, a policy management service 820, a task service 822 and one or more other services 824. It is noted that not all embodiments described include the services 808-24 described with reference to FIG. 8 and additional services may be provided in addition to or as an alternative to services explicitly described. As described, each of the services 808-24 may include one or more web service interfaces that enable the customer 804 to submit appropriately configured API calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block level data storage service 810).

The virtual computer system service 808 may be a collection of computing resources configured to instantiate virtual machine instances on behalf of the customer 804. The customer 804 may interact with the virtual computer system service 808 (via appropriately configured and authenticated API calls) to provision and operate virtual computer systems that are instantiated on physical computing devices hosted and operated by the computing resource service provider 802. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 808 is shown in FIG. 8, any other computer system or computer system service may be utilized in the computing resource service provider 802, such as a computer system or computer system service that does not employ virtualization or instantiation and instead provisions computing resources on dedicated or shared computers/servers and/or other physical devices.

The block-level data storage service 810 may comprise one or more computing resources that collectively operate to store data for a customer 804 using block-level storage devices (and/or virtualizations thereof). The block-level storage devices of the block-level data storage service 810 may, for instance, be operationally attached to virtual computer systems provided by the virtual computer system service 808 to serve as logical units (e.g., virtual drives) for the computer systems. A block-level storage device may enable the persistent storage of data used/generated by a corresponding virtual computer system where the virtual computer system service 808 may only provide ephemeral data storage.

The computing resource service provider 802 also includes a cryptography service 812. The cryptography service 812 may utilize one or more storage services of the computing resource service provider 802 to store keys of the customers in encrypted form, whereby the keys may be usable to decrypt customer keys accessible only to particular devices of the cryptography service 812.

The computing resource service provider 802 further includes an on-demand data storage service 814. The on-demand data storage service 814 may be a collection of computing resources configured to synchronously process requests to store and/or access data. The on-demand data storage service 814 may operate using computing resources (e.g., databases) that enable the on-demand data storage service 814 to locate and retrieve data quickly, to allow data to be provided in responses to requests for the data. For example, the on-demand data storage service 814 may maintain stored data in a manner such that, when a request for a data object is retrieved, the data object can be provided (or streaming of the data object can be initiated) in a response to the request. As noted, data stored in the on-demand data storage service 814 may be organized into data objects. The data objects may have arbitrary sizes except, perhaps, for certain constraints on size. Thus, the on-demand data storage service 814 may store numerous data objects of varying sizes. The on-demand data storage service 814 may operate as a key value store that associates data objects with identifiers of the data objects which may be used by the customer 804 to retrieve or perform other operations in connection with the data objects stored by the on-demand data storage service 814.

In the environment illustrated in FIG. 8, a notification service 816 is included. The notification service 816 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 816 may provide notifications to clients using a "push" mechanism without the need to periodically check or "poll" for new information and updates. The notification service 816 may further be used for various purposes such as monitoring applications executing in the virtual computer system service 808, workflow systems, time-sensitive information updates, mobile applications, and many others.

As illustrated in FIG. 8, the computing resource service provider 802, in various embodiments, includes an authentication system 818 and a policy management service 820. The authentication system 818, in an embodiment, is a computer system (i.e., collection of computing resources) configured to perform operations involved in authentication of users of the customer. For instance, one of the services 808-16 and 820-24 may provide information from a user to the authentication service 818 to receive information in return that indicates whether the user requests are authentic.

The policy management service 820, in an embodiment, is a computer system configured to manage policies on behalf of customers (such as customer 804) of the computing resource service provider 802. The policy management service 820 may include an interface that enables customers to submit requests related to the management of policy. Such requests may, for instance, be requests to add, delete, change or otherwise modify policy for a customer or for other administrative actions, such as providing an inventory of existing policies and the like.

The computing resource service provider 802, in various embodiments, is also equipped with a task service 822. The task service 822 is configured to receive a task package from the customer 804 and enable executing tasks as dictated by the task package. The task service 822 may be configured to use any resource of the computing resource service provider 802, such as one or more instantiated virtual machines or virtual hosts, for executing the task. The task service 822 may configure the one or more instantiated virtual machines or virtual hosts to operate using a selected operating system and/or a selected execution application in accordance with a requirement of the customer 804.

The computing resource service provider 802 additionally maintains one or more other services 824 based at least in part on the needs of its customers 804. For instance, the computing resource service provider 802 may maintain a database service for its customers 804. A database service may be a collection of computing resources that collectively operate to run one or more databases for one or more customers 804. The customer 804 may operate and manage a database from the database service by utilizing appropriately configured API calls. This, in turn, may allow a customer 804 to maintain and potentially scale the operations in the database. Other services include, but are not limited to, object-level archival data storage services, services that manage and/or monitor other services.

Figure 9:
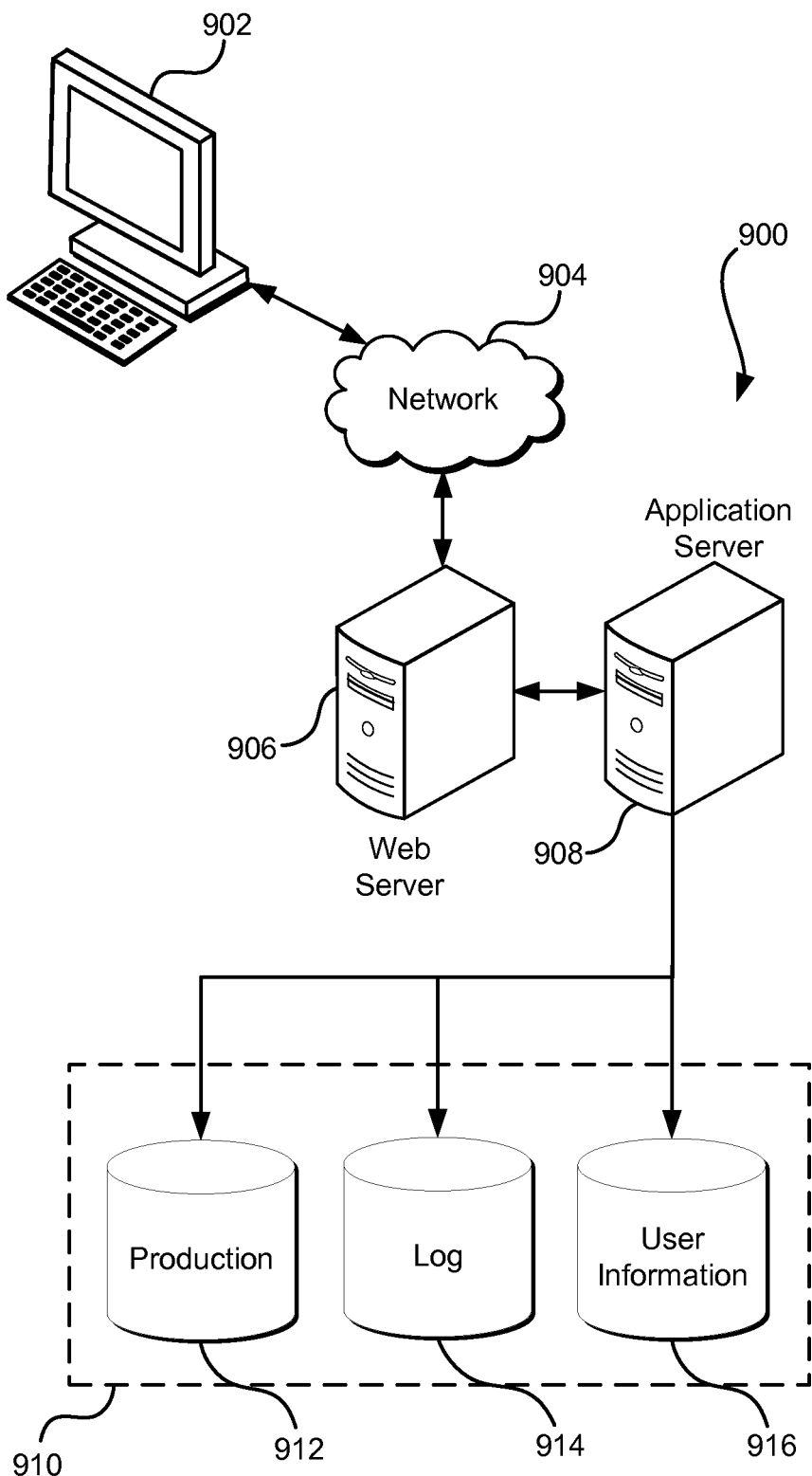
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternative embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications and patents, cited are hereby incorporated by reference to the same extent as if each reference were individually and specifically indicated to be incorporated by reference and were set forth in its entirety.

What is claimed is:

1. A computer-implemented method, comprising:
   determining a set of computing resources of a service of a computing resource service provider;
   determining a set of identities associated with a set of actions performed by the set of computing resources, and a set of policies, where a first policy of the set of policies specifies a subset of actions of the set of actions associated with a first identity of the set of identities that are performed by the set of computing resources and a second identity of the set of identities corresponds to a second user account of the computing resource service provider that is distinct to a first user account of the computing resource service provider corresponding to the first identity;
   generating an entitlement map of the set of identities and the set of actions by at least determining a set of permission levels based at least in part on the set of policies, where the entitlement map indicates, for a first resource of the set of computing resources, identities of the set of identities, actions of the set of actions, and permissions of the set of permission levels associated with the first resource;
   generating a script that, as a result of being executed, determines a permission level based at least in part on the set of identities and the set of actions;
   in response to obtaining a request for a visualization for the set of computing resources, providing the script and the visualization with a set of dimensions based at least in part on the entitlement map; and
   in response to an input from a user interface, causing the visualization to be modified by at least altering the set of dimensions based at least in part on the first resource of the set of computing resources indicated in the entitlement map.

2. The computer-implemented method of claim 1, wherein obtaining the set of policies comprises:
   obtaining a set of identity policies, wherein the first identity is associated with a first identity policy of the set of identity policies;
   obtaining a set of groups, wherein a first group of the set of groups comprises the first identity and the second identity;
   obtaining a set of group policies, wherein the first group of the set of groups is associated with a first group policy of the set of group policies; and
   the set of policies comprising the set of identity policies and the set of group policies.

3. The computer-implemented method of claim 1, wherein a permission level is one of allowed, expressly denied, implicitly denied, or conditional.

4. A system, comprising:
   memory to store instructions that, as a result of being executed by one or more processors, cause the system to:
      obtain a request to generate a visualization for a set of actions, the visualization based at least in part on a multi-dimensional table that identifies association of the set of actions with a set of identities;

obtain the set of identities associated with a set of computing resources of a service of a computing resource service provider, where a first identity of the set of identities is associated with a user account of the computing resource service provider and a computing resource of the set of computing resources is associated with an action of the set of actions;

obtain a set of policies specifying a subset of actions of the set of actions associated with the first identity of the set of identities;

generate an entitlement map of the set of identities and the set of actions by at least determining a set of permissions based at least in part on the set of policies, where the entitlement map indicates the first identity, the subset of actions, and a subset of permissions of the set of permissions associated with the computing resource; and generate the visualization to pivot around the first identity and the subset of actions performed with the set of computing resources.

5. The system of claim 4, wherein the instructions that cause the system to generate the visualization further comprise instructions that, as a result of being performed by the one or more processors, cause the system to generate the visualization as a mapping of the set of identities to the set of computing resources for visualization in a table view.

6. The system of claim 4, wherein the instructions that cause the system to generate the visualization further comprise instructions that, as a result of being performed by the one or more processors, cause the system to generate the visualization as a dynamic, interactive graphical visualization comprising graphical objects representing one or more of an identity, a group, a service, a resource, an action, a permission level, or an account.

7. The system of claim 4, wherein the instructions that cause the system to generate the visualization further comprise instructions that, as a result of being performed by the one or more processors, cause the system to determine a set of permission levels for the first identity of the set of identities, wherein a first permission level of the set of permission levels corresponds to an action of the subset of actions.

8. The system of claim 7, wherein the first permission level of the set of permission levels is represented by a graphical object in the visualization.

9. The system of claim 7, wherein an action of the subset of actions is
implicitly denied as a result of the set of permissions associated with the first identity neither expressly granting nor expressly denying the first identity permission to perform the action.

10. A non-transitory computer-readable storage medium having stored thereon executable instructions that, as performed by one or more processors of a computer system, cause the computer system to at least:

determine a set of identities corresponding to a user account;

determine a set of actions performed with a set of computing resources;

determine a set of policies associated with the set of identities, wherein the set of policies specifies a first action of the set of actions performed by a first identity of the set of identities;

generate a mapping of the set of actions and the set of computing resources, where the mapping indicates for a first computing resource of the set of computing resources the first identity and the first action associated with the first computing resource based at least in part on the set of policies;

generate a visualization capable of pivoting around the mapping, wherein the visualization indicates a subset of actions of the set of actions associated with a subset of identities of the set of identities performed with a subset of computing resources of the set of computing resources, the visualization capable of pivoting around a plurality of dimensions corresponding to a number of dimensions of a matrix comprising the subset of actions and the subset of computing resources; and provide the visualization and a script that, as a result of being executed, determines a permission level based at least in part on the set of policies, the set of identities, and the set of actions.

11. The non-transitory computer-readable storage medium of claim 10, wherein the visualization is provided in response to a request obtained from an application programming interface call from a browser.

12. The non-transitory computer-readable storage medium of claim 10, wherein the set of policies is based at least in part on an access control list or a declarative policy language that specifies levels of access to a set of computing resources.

13. The non-transitory computer-readable storage medium of claim 10, wherein the instructions further comprise instructions that, as a result of being performed by the one or more processors, cause the computer system to obtain a selection of a filter, wherein applying the filter to the visualization produces a filtered visualization that excludes data from the visualization that fails to satisfy one or more conditions of the filter.

14. The non-transitory computer-readable storage medium of claim 10, wherein a policy of the set of policies is updated in accordance with input obtained through the visualization.

15. The non-transitory computer-readable storage medium of claim 10, wherein the instructions that generate the visualization further comprise instructions that, as performed by the one or more processors, cause the computer system to generate an optimization script for the visualization in response to an addition, removal, or change to at least one of an identity of the set of identities, a member of a group associated with a computing resource of the set of computing resources, or a policy of the set of policies.

16. The non-transitory computer-readable storage medium of claim 10, wherein the set of actions is categorized by action type, and a preset filter causes the visualization to be visualized with actions of the set of actions grouped by action type.

17. The non-transitory computer-readable storage medium of claim 10, wherein the instructions that cause the computer system to generate a visualization further include instructions that, as performed by one or more processors of a computer system, cause the computer system to generate the visualization based at least in part on an optimization result of executing the script.

18. The non-transitory computer-readable storage medium of claim 17, wherein the script is executed in a browser.

19. The system of claim 7, wherein an action of the subset of actions is explicitly denied for the first identity as a result of a permission of the set of permissions indicating an express denial of the first identity to perform the action.

* * * * *